(12) United States Patent
Miller

(10) Patent No.: US 10,708,314 B2
(45) Date of Patent: Jul. 7, 2020

(54) HYBRID DISTRIBUTED COMMUNICATION

(71) Applicant: Genband US LLC, Plano, TX (US)

(72) Inventor: Paul Miller, Derry, NH (US)

(73) Assignee: GENBAND US LLC, Plano, TX (US)

( * ) Notice: Subject to any disclaimer, the term of this patent is extended or adjusted under 35 U.S.C. 154(b) by 172 days.

(21) Appl. No.: 15/851,353

(22) Filed: Dec. 21, 2017

(65) Prior Publication Data

US 2018/0183841 A1 Jun. 28, 2018

Related U.S. Application Data

(60) Provisional application No. 62/438,667, filed on Dec. 23, 2016.

(51) Int. Cl.
| | |
|---|---|
| *H04L 29/06* | (2006.01) |
| *H04L 29/08* | (2006.01) |
| *G06F 9/455* | (2018.01) |
| *H04L 12/64* | (2006.01) |

(52) U.S. Cl.
CPC ...... *H04L 65/1069* (2013.01); *G06F 9/45558* (2013.01); *H04L 65/1006* (2013.01); *H04L 65/608* (2013.01); *H04L 67/10* (2013.01); *H04L 67/38* (2013.01); *G06F 2009/45583* (2013.01); *G06F 2009/45595* (2013.01); *H04L 12/6418* (2013.01); *H04L 2012/6486* (2013.01)

(58) Field of Classification Search
None
See application file for complete search history.

(56) References Cited

U.S. PATENT DOCUMENTS

| | | | |
|---|---|---|---|
| 2015/0288622 A1 | 10/2015 | Fargano et al. | |
| 2015/0358248 A1* | 12/2015 | Saha | H04L 43/0817 |
| | | | 709/226 |
| 2016/0057209 A1* | 2/2016 | Parikh | H04L 67/10 |
| | | | 709/203 |
| 2016/0261554 A1* | 9/2016 | Li | H04L 61/1529 |
| 2016/0352578 A1* | 12/2016 | Chen | H04L 41/12 |

OTHER PUBLICATIONS

PCT, Notification of Transmittal of the International Search Report and the Written Opinionof the International Searching Authority, or the Declaration, dated Mar. 16, 2018, 11 pages.

* cited by examiner

*Primary Examiner* — Nasser M Goodarzi
*Assistant Examiner* — Terrika Peterson
(74) *Attorney, Agent, or Firm* — Haynes and Boone, LLP

(57) ABSTRACT

A method includes establishing a connection between a physical signaling module and a physical media module, the physical signaling module configured to establish a connection between two communication endpoints, the physical media module configured to transfer media between the two communication endpoints. The method further includes establishing a connection between the physical signaling module and a media Virtual Network Function (VNF) module, the media VNF module running in a cloud-based environment, the media VNF module configured to transfer media between the two communication endpoints.

20 Claims, 6 Drawing Sheets

HYBRID DISTRIBUTED COMMUNICATION

PRIORITY INFORMATION

This application is a non-provisional application that claims the benefit of U.S. Provisional Patent No. 62/438,667 filed Dec. 23, 2016 and entitled "Hybrid Distributed Communication," the disclosure of which is hereby incorporated by reference in the entirety.

BACKGROUND

The present disclosure relates generally to Network Functions Virtualization (NFV) and more particularly to methods and systems for managing networks for elastic Virtual Network Functions (VNFs). NFV is a concept that involves virtualization of various telecommunication functions that are then interconnected to provide telecommunication services. Particularly, specific telecommunication functions that are typically performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

SUMMARY

A method includes establishing a connection between a physical signaling module and a physical media module, the physical signaling module configured to establish a connection between two communication endpoints, the physical media module configured to transfer media between the two communication endpoints. The method further includes establishing a connection between the physical signaling module and a media Virtual Network Function (VNF) module, the media VNF module running in a cloud-based environment, the media VNF module configured to transfer media between the two communication endpoints.

A method includes establishing a connection between a first type of physical module and a second type of physical module, the first type of physical module performing a first type of communication function and the second type of physical module performing a second type of communication function. The method further includes establishing a connection between the second type of physical module and a first type of Virtual Network Function (VNF) module running in a cloud-based environment, the first type of VNF module performing the first type of communication function.

A system includes a cloud-based environment comprising a plurality of physical machines supporting a plurality of virtual machines, the virtual machines running a plurality of first type VNF components that perform a first communication function and a plurality of second type VNF components that perform a second communication function. The system further includes a first physical server in communication with the cloud-based environment, the first physical server configured to perform the first communication function, the first physical server having a connection to at least one of the plurality of second type VNF components. The system further includes a second physical server in communication with the cloud-based environment, the second physical server configured to perform the second communication function, the second physical server having a connection to at least one of the plurality of first type VNF components.

BRIEF DESCRIPTION OF THE DRAWINGS

Aspects of the present disclosure are best understood from the following detailed description when read with the accompanying figures.

Figure 1:
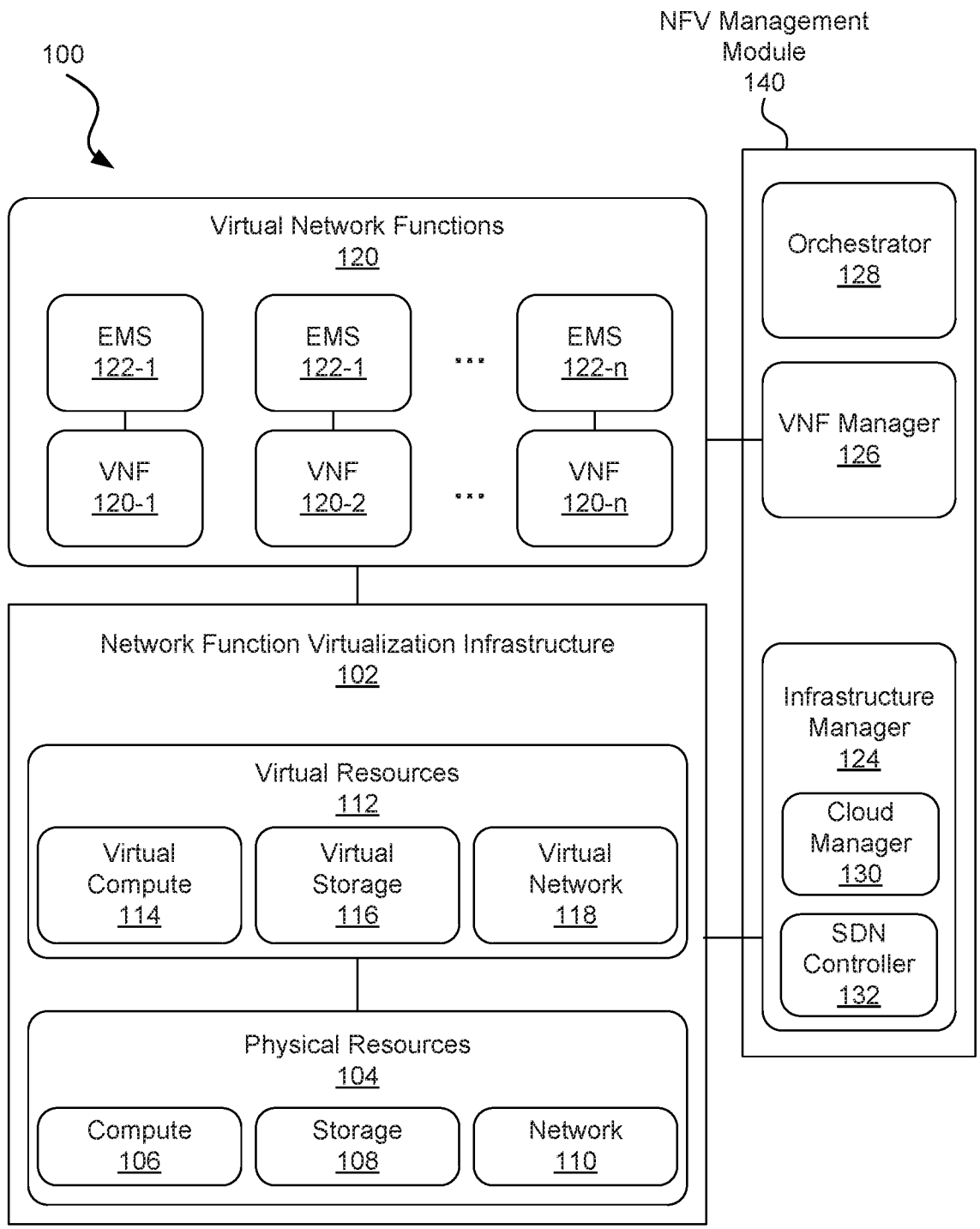
FIG. 1 is a diagram showing network function virtualization, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. One benefit of NFV is that it provides elasticity. A VNF typically includes several VNF components. In some cases, each VNF component may be running on a different virtual machine. In some cases, some VNF components may be similar instances of the same application. Such instances may handle up to a certain capacity of telecommunication services. As demand for services changes, the number of VNF components can change as well. For example, if demand increases to a certain percentage of overall capacity for the VNF, an additional VNF component can be created to increase the overall capacity of the VNF. Conversely, if demand decreases below a certain percentage of overall capacity for the VNF, a VNF component can be removed. This frees up computing resources for other applications within the cloud VNF components within a VNF can be logically grouped based on their respective functions. For example, one VNF group may perform signaling functions while another group performs media transfer functions. In another example, there may be a service group, a database group, and a load balancer group. The service group includes VNF components that perform the processing for the primary function of the VNF. The VNF components within the database group manage and store data used by the VNF components within the service cluster. The VNF components within the load balancer group balance the workload among the VNF components within the service cluster.

According to principles described herein, VNFs that are distributed by function may interact with legacy hardware systems that are also distributed by function. For example, there may be a first physical server that performs a first type of function (e.g., signaling) and a second physical server that performs a second type of function (e.g., media transfer). Additionally, there may be a first set of VNFs that perform the first function and a second set of VNFs that perform the second function. The physical servers may function together with the VNFs to provide a hybrid, distributed communication function. Details of such a hybrid, distributed communication function will be described in further detail below.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by an NFV management module 140.

The NFVI 102 includes a set of physical resources 104 that are used to provide a set of virtual resources 112. The physical resources 104 include computing resources 106, storage resources 108, and network resources 110. Other resources, such as input/output resources are contemplated as well. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by an infrastructure manager 124, which is part of the NFV management module 140. The infrastructure manager 124 may operate under a set of pre-defined rules that instruct the infrastructure manager how to manage the NFVI 102. Such rules may be adjusted by a human operator as desired. For example, such rules may instruct the infrastructure manager 124 how to provision additional virtual machines when instructed to do so. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired.

In the present example, the infrastructure manager 124 includes two components. Specifically, the infrastructure manager 124 includes a cloud manager 130 and an SDN controller 132. The cloud manager 130 is responsible for managing the cloud computing environment provided by the virtual resources 112 of the NFVI 102. For example, the cloud manager 130 may be responsible for provisioning additional virtual machines within the cloud computing environment when instructed to do so. The cloud manager 130 may have access to a set of pre-defined rules. Such rules may be configured and/or defined by a human administrator. Such rules may be stored as a data structure in physical memory. In one example, such rules may instruct the cloud manager 130 how to tear down a virtual machine when instructed to do so. One example of a cloud manager 130 includes the open-source cloud computing software platform provided by the Openstack Foundation under the name OpenStack™.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure. The SDN controller 132 may have access to a set of pre-defined rules. Such rules may be configured and/or defined by a human administrator. Such rules may be stored as a data structure in physical memory. One example of a rule used by the SDN controller 132 may be how to establish virtual network connections when instructed to do so.

As described above, a VNF 120 represents a virtualization of specific telecommunication functions that are typically performed by specialized pieces of hardware. Examples of a VNF 120 include, but are not limited to, an SBC, an Internet Protocol (IP) Multimedia Subsystem (IMS) core, and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-$n$ and corresponding EMSs 122-1, 122-2 . . . 122-$n$ are used to provide NFV.

An EMS 122 may have access to a set of pre-defined rules. Such rules may be configured and/or defined by a human administrator. Such rules may be stored as a data structure in physical memory. One example of a rule used by an EMS 122 may define what statistics should be collected regarding operation of the VNF 120.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below. In some examples, the VNF component can communicate with the core network over a first network and communicate with the access network over a second network. The first network is isolated from the second network such that communication between the VNF and the core network does not traverse the same physical network components as the communication between the VNF and the access network.

The VNFs 120 are managed by a VNF manager 126, which is part of the NFV management module 140. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service. The VNF manager 126 may have access to a set of pre-defined rules. Such rules may be configured and/or defined by a human administrator. Such rules may be stored as a data structure in physical memory. One example of a rule used by the VNF manager 126 may be when to instruct the cloud manager 130 to provision an additional virtual machine. For example, when demand for services reaches a certain threshold of capacity, the VNF manager 126 can instruct the cloud manager to provision an additional virtual machine so that an additional VNF component can be provisioned.

As will be described in further detail below, the VNFs 120 may have multiple components. Each VNF component may run on a different virtual machine. The VNF components within a VNF can be divided into different groups, each group assigned a different function. Thus, instead of a single type of VNF component that performs a variety of functions, the different groups of VNF components perform different functions. Additionally, different groups are managed differently. Thus, different groups can be scaled in different ways and use different redundancy mechanisms that best suit such groups.

Figure 2A:
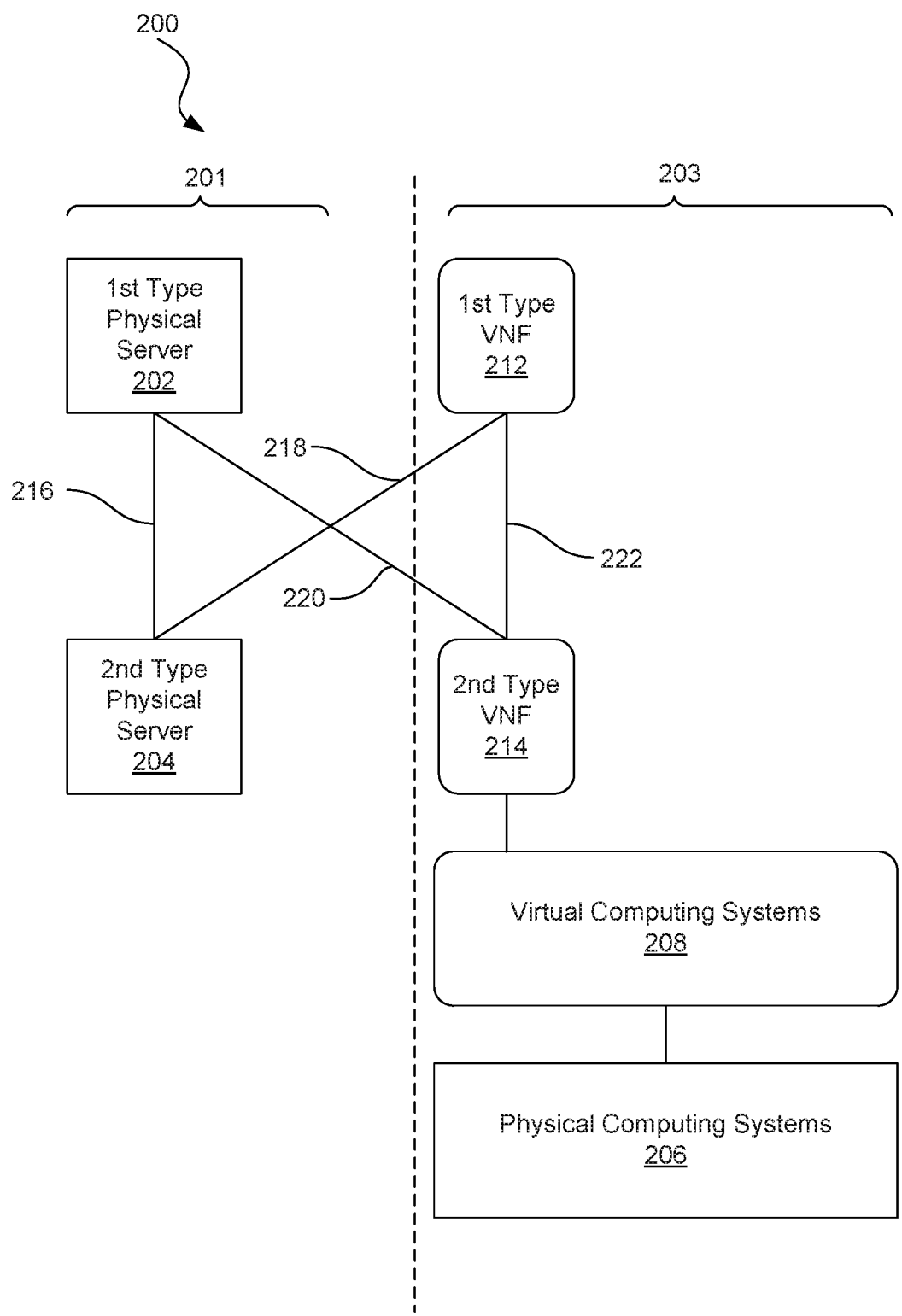
FIGS. 2A-2C are diagrams showing hybrid, distributed communication, according to one example of principles described herein.
Figure 2B:
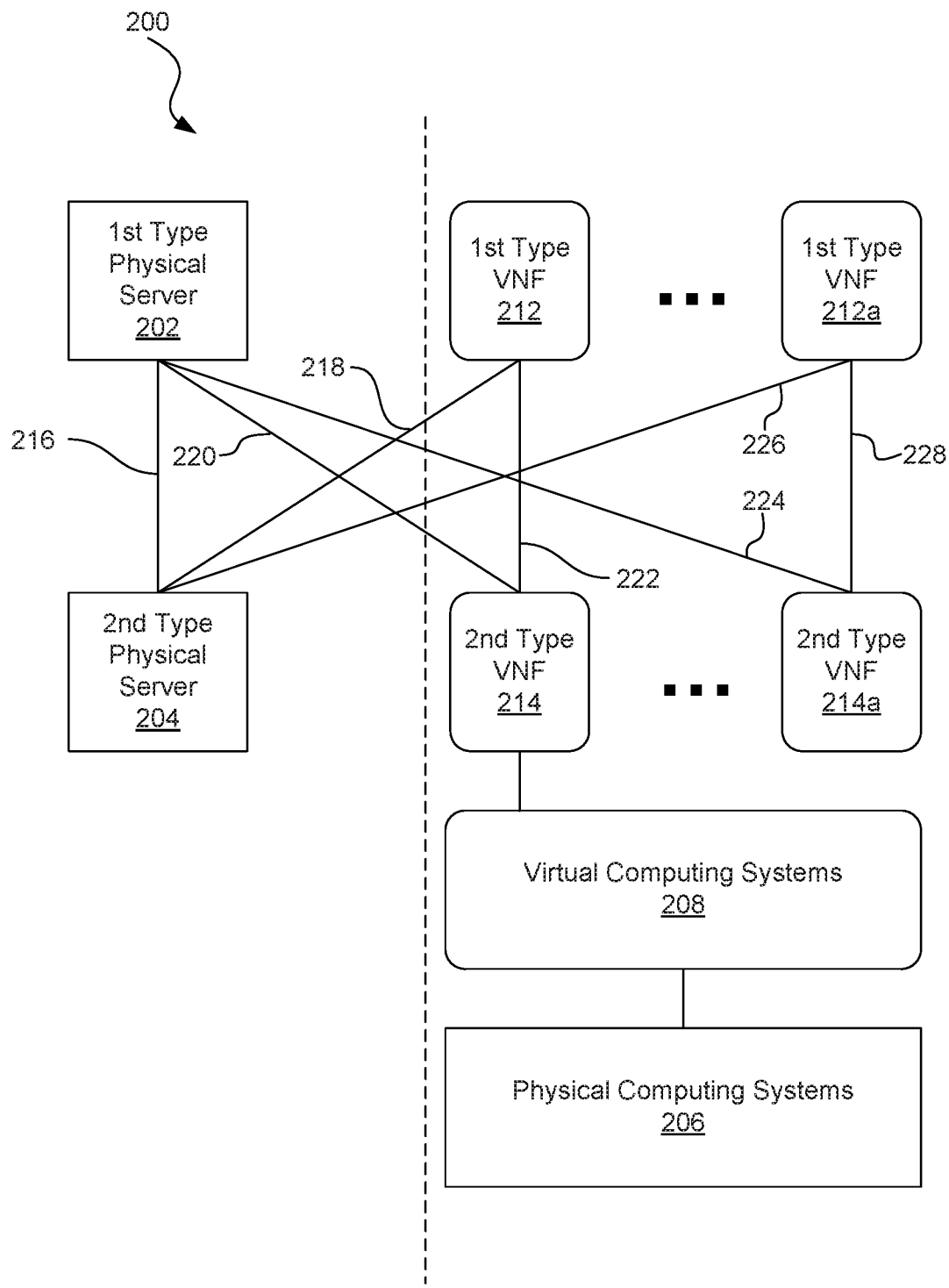
Figure 2C:
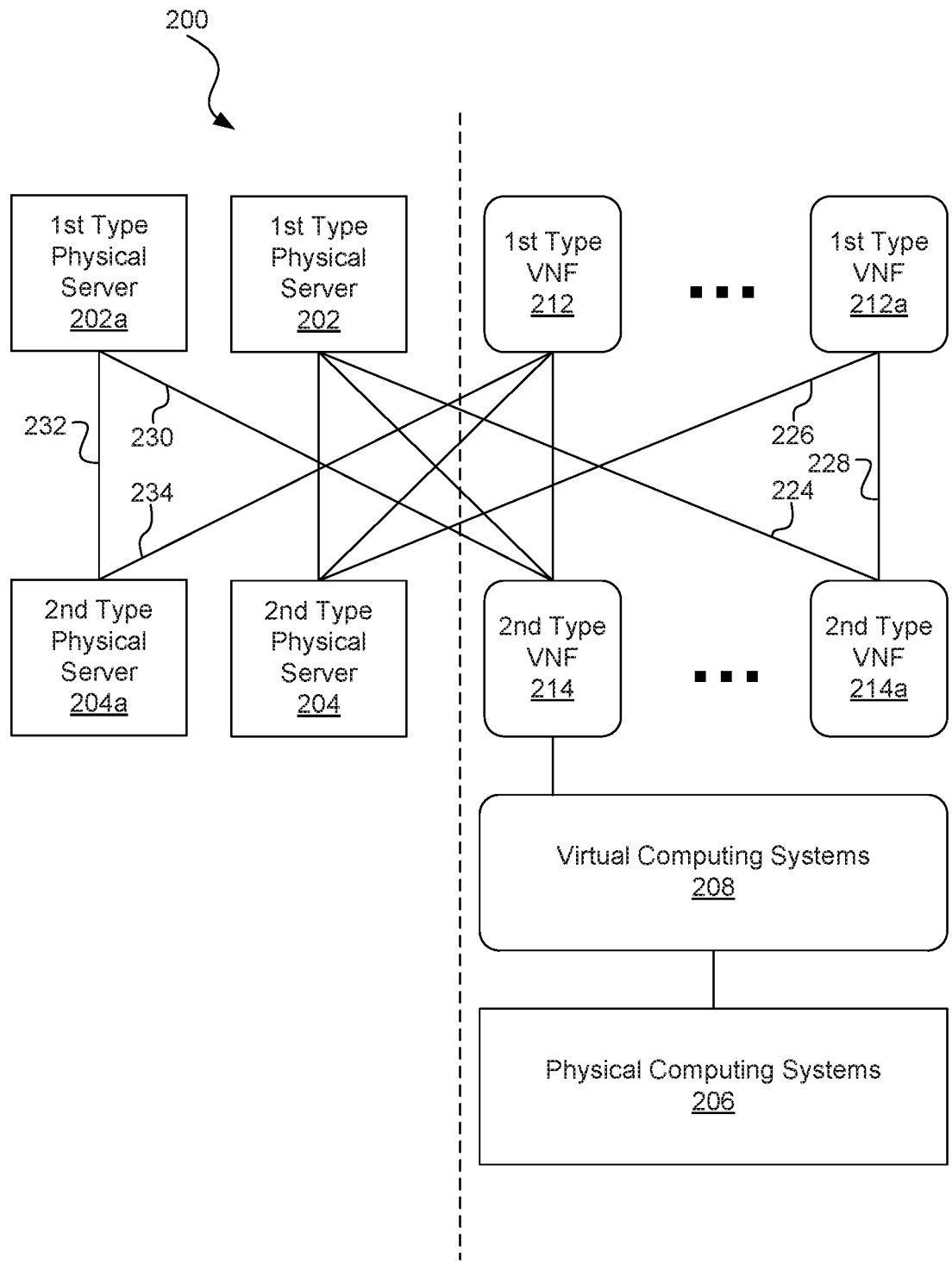

FIGS. 2A-2C are diagrams showing hybrid, distributed communication. According to the present example, a hybrid VNF 200 includes physical components 201 and virtual components 203. The physical components 201 may include physical servers that provide specific functions as dedicated pieces of hardware in a communications network. Thus, the physical components 201 may include processors and memory with machine readable instructions that when executed by the processors, cause the physical components 201 to perform their specified functions.

The virtual components 203 include VNFs that run on the plurality of virtual computing systems 208. The virtual computing systems may run on a plurality of physical computing systems 206. The physical computing systems 206 may form part of one or more data centers. The physical computing systems 206 may correspond to the physical resources (104, FIG. 1) described above. Additionally, the virtual computing systems 208 may correspond to the virtual resources (112, FIG. 1) described above.

In the present example, as illustrated in FIG. 2A, there is a first type physical server 202 and a second type physical server 204. The first type physical server 202 may perform one type of telecommunication function while the second type physical server 204 may perform a different type of telecommunication function. For example, the first type physical server 202 may perform a signaling function that utilizes Session Initiation Protocol (SIP). The second type physical server 204 may perform a media transfer function that utilizes Real-time Transport Protocol (RTP).

In the present example, there may be two different types of VNF components 212, 214. The first type VNF 212 may perform a function that is similar to that of the first type physical server 202. For example, the first type VNF 212 may perform the signaling function. Additionally, the second type VNF 214 may perform a function that is similar to that of the second type physical server 204. For example the second type VNF 214 may perform the media transfer function.

In the present example, network connections are established between each of the physical components 201 and virtual components 203. Specifically a network connection 216 is established between the first type physical server 202 and the second type physical server 204. Additionally, a network connection 220 is established between the first type physical server 202 and the second type VNF 214. Thus, the first type physical server 202 is connected to both physical second type components and virtual second type components. Similarly, a network connection 218 is established between the first type VNF 212 and the second type physical server 204. Additionally, a network connection 222 is established between the first type VNF 212 and the second type VNF 214. Thus, the first type VNF 212 is connected to both physical second type components and virtual second type components.

In some examples, establishing a connection involves providing both endpoints with the physical and logical addresses of the other endpoint. For example, for connection 220, the first type physical server 202 may have the physical and logical address of the second type VNF 214. Conversely, the second type VNF 214 is provided with the physical and logical address of the first type physical server 202. Additionally, routing tables of routers within the network between the two endpoints may be updated accordingly. In some examples, the connections may involve a bi-directional open communication session between the two endpoints. For example, there may be an open communication session between the first type physical server 202 and the second type VNF component 214.

In some examples, as demand for telecommunication services changes, the number of VNF components may change as well. As described above, VNF components may be added and removed dynamically in response to changing demand. In the present example, an additional first type VNF 212a is created. Additionally, a new connection 226 is established between the second type physical server 204 and the additional first type VNF 212a. An additional second type VNF 214a is also created. Thus, an additional connection 224 is established between the first type physical server 202 and the additional second type VNF 214a. In some examples, an additional connection to 28 may also be established between the two additional VNFs 212a, 214a.

While only one additional first type VNF 212a and one additional second type VNF 214a are illustrated, multiple additional first type VNFs and second type VNFs may be created. Additionally, connections to those multiple additional VNFs and the other components of the hybrid, distributed VNF 200 may be established. The number of first type VNFs 212a may be scaled independently of the second type VNFs 214a. For example, there may be a change in demand for the function of the first type components but not an increase in demand for the second type components. Thus, only the number of first type VNFs may be adjusted. Alternatively, there may be a change in demand for the function of the second first type components but not an increase in demand for the second type components. Thus, only the number of second type VNFs may be adjusted.

In some examples, the hybrid, distributed VNF may include multiple first type physical servers and/or multiple second type physical servers. As shown in FIG. 2C, there is an additional first type physical server 202a and an additional second type physical server 204a. The additional first type physical server 202a may be connected to both physical second type components and virtual second type components. Specifically, connection 232 is established between first type physical server 202a and second type physical server 204a. Additionally connection 230 is established between the first type physical server 202a and the second type VNF 214. The additional second type physical server 204a may also be connected to one or more first type virtual components. For example, connection 234 is established between the second type physical server 204a and the first type VNF 212.

Connections between multiple physical types and multiple virtual types of components may be established under the direction of a VNF manager (e.g., 126, FIG. 1). In some examples, the VNF manager may manage both the virtual VNF components as well as the physical components that form the hybrid, distributed VNF 200. In some examples, the physical nature some of the components of the hybrid, distributed VNF may be transparent to the VNF manager. In other words, from the perspective of the VNF manager, the physical components 201 may present themselves as virtual components.

Figure 3:
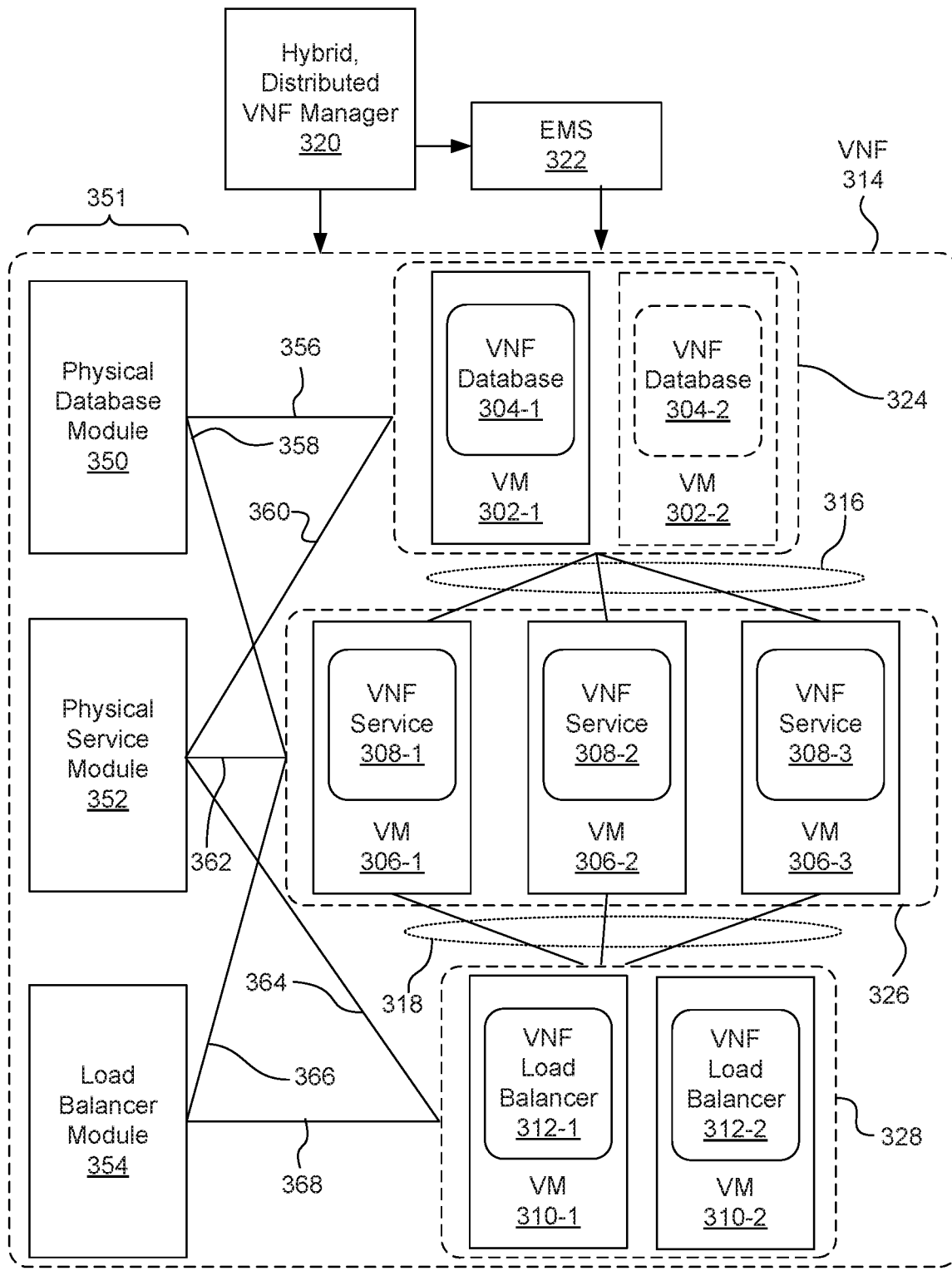
FIG. 3 is a diagram showing hybrid, distributed communication with three different types of functions, according to one example of principles described herein.

FIG. 3 is a diagram showing hybrid, distributed communication with three different types of functions. In the present example, the distributed VNF includes a database function, a service function, and a load balancer function. The VNF components will be described as belonging to different groups 324, 326, 328 based on their respective functions.

According to the present example, a hybrid, distributed VNF 314 is managed by a hybrid, distributed VNF manager 320. The VNF manager 320 is in communication with an EMS 322. The VNF manager 320 corresponds to the VNF manager 126 described above. The VNF 314 includes different types of VNF components 304, 308, 312. Specifically, a database group 324 includes a set of database components, in this case, database components 304-1 and 304-2. A service group 326 includes a set of service components 308-1, 308-2, 308-3. The load balancer group 328 includes a set of load balancer components, in this case load balancer components 312-1 and 312-2. Each of the VNF components 304, 308, 312 within each group may run on a different virtual machine 302, 306, 310. While the present example illustrates the case where there are three different types of VNF components, other examples may include a different grouping of VNF components.

In the present example, the database components 304 run on virtual machines 302. The database components 304 store a variety of data that is used by other VNF components. For example, the database components 304 may include subscriber related data for at least a subset of the subscribers of the telecommunication service associated with the VNF 314. In some examples, one of the database components 304 may be a real-time cache to store real time data used by the service components 308. Thus, if one of the service components 308 fails, another service component can readily take over for the failed service component 308. The database components 304 are connected to the service components 308 through connections 316. The connections 316 are part of a virtual network associated with the VNF 314.

In the present example, the load balancer components 312 run on virtual machines 310. The load balancer components 312 balance the workload of the VNF 314 between the service components 308. The load balancer components 312 may also act as an access point between the core network to which the VNF 314 belongs and the access network. The access network is the part of a telecommunications network that connects a subscriber's communication device (e.g., a phone, cellular phone, or computer) to the core network. The load balancer components 312 are connected to the service components 308 through connections 318. The connections 318 are part of the virtual network associated with the VNF 314.

VNF components are grouped based on their respective functions. For example, a VNF component that is designed to perform data storage functions is grouped by the VNF manager into the database cluster 324. A VNF component that is designed to provide the primary processing functions of the VNF is grouped by the VNF manager into the service cluster 326. A VNF that is designed to perform load balancer functions is grouped by the VNF manager into the load balancer cluster 328.

Like the hybrid, distributed VNF 200 described above, the VNF 314 may include physical components 351 that are also grouped by function. In the present example, the physical components 351 include a physical database module 350. The physical database module 350 may be a physical server that includes a processor and a memory with machine readable instructions that when executed by the processor, cause the physical database module 350 to perform the database function. In other words, the physical database module 350 performs the same function as the VNF database components 304. A connection 356 may be established between the physical database module 350 and the database group 324 of VNF database components 304. Additionally, a connection 358 may be established between the physical database module 350 and the service group 326 of VNF service components 308.

In the present example, the physical components 351 include a physical service module 352. The physical service module 352 may be a physical server that includes a processor and a memory with machine readable instructions that when executed by the processor, cause the physical service module 352 to perform the service function. In other words, the physical service module 352 performs the same function as the VNF service components 308. A connection 362 may be established between the physical service module 352 and the service group 326 of VNF service components 308. Additionally, a connection 360 may be established between the physical service module 352 and the database group 324 of VNF database components 304. A connection 364 may be established between the physical service module 352 and the load balancer group 328 of VNF load balancer components 312.

In the present example, the physical components 351 include a physical load balancer module 354. The physical load balancer module 354 may be a physical server that includes a processor and a memory with machine readable instructions that when executed by the processor, cause the physical load balancer module 354 to perform the load balancer function. In other words, the physical load balancer module 354 performs the same function as the VNF database components 304. A connection 366 may be established between the physical load balancer module 354 and the service group 326 of VNF service components 308. Additionally, a connection 368 may be established between the load balancer module 354 and the load balancer group 328 of VNF load balancer components 312.

Each of the different groups 324, 326, 328 of VNF components may be independently scaled. For example, in response to a certain conditions, an additional database component may be provisioned within the database group 324. The conditions that may cause an additional database component to be provisioned can be different than the conditions that cause additional VNF components to be provisioned within other groups. In one example, the additional database component may be provisioned in response to storage utilization reaching a certain percentage of total capacity. For example, if storage utilization reaches 80% of capacity, then the VNF manager can cause the additional database component to be provisioned. In some cases, the number of database components 304 may be scaled back if it is determined that a small enough percentage of total capacity is being used. Thus, computing resources may be freed for use by other applications. Similar scaling can be performed for the service group 326 and the load balancing group.

As new VNF components in any of the groups 324, 326, 328 are provided, the VNF manager ensures that such new VNFs are appropriately connected to the rest of the VNF. Because the VNF 314 includes physical components 351, this includes establishing connections between the physical components and the new VNF components as well.

Figure 4:
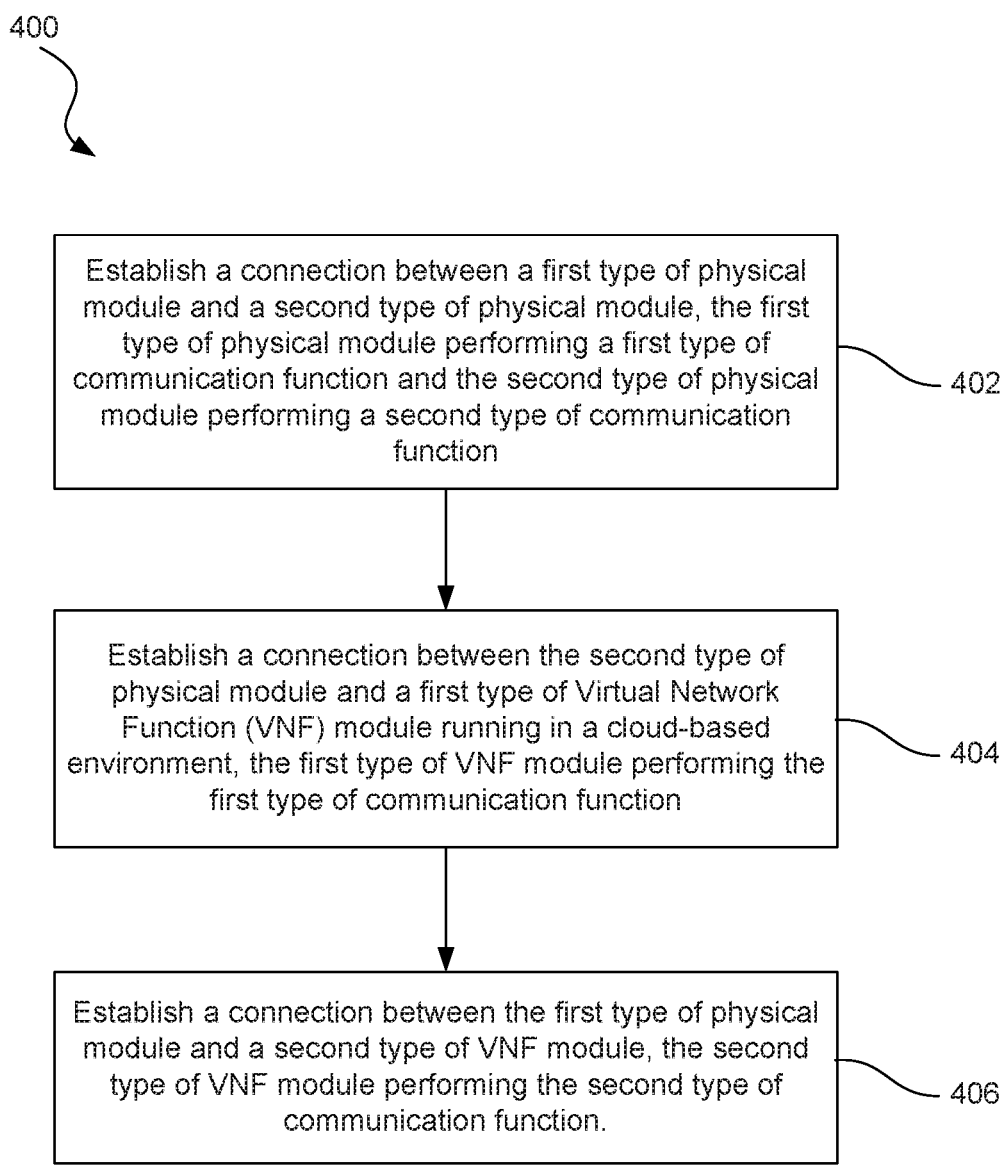
FIG. 4 is a flowchart showing an illustrative method for hybrid, distributed communication, according to one example of principles described herein.

FIG. 4 is a flowchart showing an illustrative method for hybrid, distributed communication. According to the present example, the method 400 includes a step 402 for establishing a connection between a first type of physical module and a second type of physical module. The physical modules may be physical devices dedicated to perform specified telecommunication functions. The first type of physical module performs a first type of communication function, such as a signaling function. The second type of physical module performs a second type of communication function, such as a media transfer function.

According to the present example, the method 400 includes a step 404 for establishing a connection between the second type of physical module and a first type of Virtual Network Function (VNF) module. The first type of VNF module may be running in a cloud-based environment. The cloud-based environment may be, for example, the virtual resources 112 described above. The first type of VNF module performs the same type of communication function as the first physical module.

According to the present example, the method 400 includes a step 406 for establishing a connection between the first type of physical module and a second type of VNF module. The second type of VNF module also runs in the cloud-based environment. The second type of VNF module performs the same type of communication function as the second physical module.

By utilizing principles described herein, VNFs may utilize legacy physical systems in an efficient manner. Specifically, legacy hardware, such as a Session Border Controller (SBC) that is distributed, can be integrated and enhanced with dynamically scalable VNF components. For example, the physical signaling components can be enhanced with the dynamically scalable VNF signaling components. Likewise, the physical media transfer components can be enhanced with the dynamically scalable VNF media transfer components.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising: establishing a connection between a physical signaling module and a physical media module, the physical signaling module configured to establish a connection between two communication endpoints, the physical media module configured to transfer media between the two communication endpoints; and establishing a connection between the physical signaling module and a media Virtual Network Function (VNF) module, the media VNF module running in a cloud-based environment and on a physical machine other than the physical signaling module, the media VNF module configured to transfer media between the two communication endpoints; wherein the physical signaling module and the physical media module are outside the cloud-based environment.

2. The method of claim 1, further comprising, establishing a connection between the physical media module and a signaling VNF module, the signaling VNF module running in a cloud-based environment, the signaling VNF module configured to establish a connection between two communication endpoints.

3. The method of claim 2, further comprising, establishing additional connections between the physical media module and additional signaling VNF modules.

4. The method of claim 2, further comprising, establishing additional connections between the signaling VNF module and additional physical media modules.

5. The method of claim 1, further comprising, establishing additional connections between the physical signaling module and additional media Virtual Network Function (VNF) modules.

6. The method of claim 1, further comprising, establishing additional connections between the media VNF module and additional physical signaling modules.

7. The method of claim 1, wherein the physical signaling module, the physical media module, and the media VNF module function as a Session Border Controller (SBC).

8. The method of claim 1, wherein the cloud-based environment supports multiple instances of the media VNF module and multiple instances of a signaling VNF module, the signaling VNF module configured to establish a connection between two communication endpoints.

9. The method of claim 8, wherein the multiple instances of the media VNF module are independently scalable with respect to the multiple instances of the signaling VNF module.

10. The method of claim 1, wherein the physical signaling module utilizes Session Initiation Protocol (SIP) and the physical media module and the media VNF module utilize Real-time Transport Protocol (RTP).

11. A method comprising: establishing a connection between a first type of physical module and a second type of physical module, the first type of physical module performing a first type of communication function and the second type of physical module performing a second type of communication function;

establishing a connection between the second type of physical module and a first type of Virtual Network Function (VNF) module running in a cloud-based environment and on a physical machine other than the physical signaling module, the first type of VNF module performing the first type of communication function;

wherein the physical signaling module and the physical media module are outside the cloud-based environment.

12. The method of claim 11, wherein the first type of communication function is a signaling function.

13. The method of claim 12, wherein the signaling function utilizes Session Initiation Protocol (SIP).

14. The method of claim 11, wherein the second type of communication function is a media transfer function.

15. The method of claim 14, wherein the media transfer function utilizes Real-time Transport Protocol (RTP).

16. The method of claim 11, further comprising, establishing a connection between the first type of physical module and a second type of VNF module, the second type of VNF module performing the second type of communication function.

17. The method of claim 16, wherein the cloud-based environment is configured to support multiple instances of the first type of VNF module and multiple instances of the second type of VNF module, the multiple instances of the first type of VNF module and the multiple instances of the second type of VNF module being independently scalable.

18. A system comprising: a cloud-based environment comprising a plurality of physical machines supporting a plurality of virtual machines, the virtual machines running a plurality of first type VNF components that perform a first communication function and a plurality of second type VNF components that perform a second communication function; a first physical server in communication with and outside of the cloud-based environment, the first physical server configured to perform the first communication function, the first physical server having a connection to at least one of the plurality of second type VNF components; and a second physical server in communication with and outside of the cloud-based environment, the second physical server configured to perform the second communication function, the second physical server having a connection to at least one of the plurality of first type VNF components.

19. The system of claim 18, wherein the first communication function is a signaling function and the second communication function is a media transfer function.

20. The system of claim 18, wherein the plurality of first type VNF components and the plurality of second type VNF components are independently scalable.

* * * * *